Jan. 27, 1931.  P. J. BRENNAN  1,790,365
ICE CREAM FREEZER ATTACHMENT
Filed April 22, 1929

Inventor
Patrick J. Brennan

By Horace A. Handley
Attorney

Patented Jan. 27, 1931

1,790,365

UNITED STATES PATENT OFFICE

PATRICK JOSEPH BRENNAN, OF TUXEDO PARK, NEW YORK

ICE-CREAM-FREEZER ATTACHMENT

Application filed April 22, 1929. Serial No. 357,107.

This invention relates to new and useful improvements in ice-cream freezers, and particularly to the dashers therefor.

Great difficulty is experienced in preventing oil, dirt, salt, and other foreign matter, from getting into the can of the ice-cream freezer, through the opening where the upper end of the dasher extends for engagement with the driving means of the freezer. It is necessary that the gears of the driving mechanism be supplied with lubricant, from time to time, and it has been found that some of this lubricant combines with water or salt, and runs down the dasher rod, into the can, thus contaminating the ice-cream. The joint between the upper end of the dasher rod and the opening of the can lid is not sufficiently tight, and after a time becomes so large as to permit ready entrance of foreign matter.

It is the principal object of the present invention to provide a dasher, which has a rod provided with means which effectively prevent entrance of foreign matter into the cream within the can.

Other objects and advantages will be apparent from the following description when taken in connection with the accompanying drawing.

Figure 1:
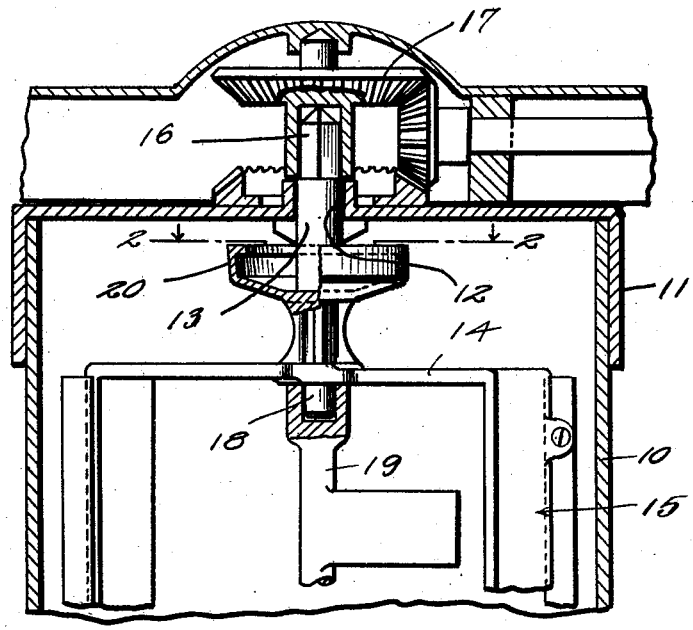
Figure 1 is a vertical sectional view through the upper portion of the can of an ice-cream freezer, to show the invention.
Figure 2:
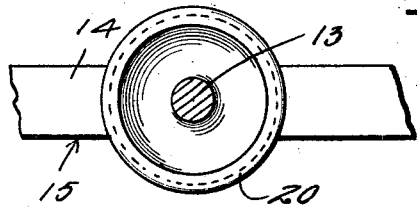
Figure 2 is a vertical sectional view on the line 2—2 of Figure 1.

Referring particularly to the accompanying drawing, 10 represents the upper portion of the can of an ice-cream freezer, having the removable lid 11, provided with the central flanged opening 12 for the passage of the stem 13, formed on the upper cross bar 14, of the frame 15, of the dasher. The upper end of this stem is angular in cross section, as shown at 16, for driving connection with the driving mechanism 17, of the freezer. In the lower face of the cross bar 14 there is formed a socket 18 in which is received the upper end of the dasher rod 19, said socket being formed directly below the base of the stem 13.

Formed integrally with the stem 13, intermediate the length thereof, is a cup 20, the concave face of which is directed upwardly, and is arranged just below the said flanged opening 12, of the lid 11.

Ordinarily, the opening 12, of the lid 11, of the can of an ice-cream freezer is somewhat larger than the rod or stem which passes therethrough, or after using the freezer for a length of time such opening and rod become so worn as to permit foreign matter, such as salty water, dust, or oil passing down the dasher rod or stem into the can, thereby contaminating the contents of the can. It will be particularly noted that the cup 20 is located directly beneath the opening 12, close up to the lower face of the lid 11, so that should any foreign matter, and particularly lubricant from the gearing, pass through said opening it will be received in the cup, so that the contents of the can will be protected from contamination. It will be understood that the amount of foreign matter which might pass through the opening 12 will be rather small, but any quantity of foreign matter, particularly of lubricant or salt, which might enter the can, through said opening, would be sufficient to contaminate the contents and render the same unfit to eat. The cup 20 is of comparative small size, sufficient to collect any matter which might enter the can.

What is claimed is:

As an article of manufacture, a dasher frame including an upper horizontal cross bar provided with an integral vertical central stem, said stem having a cup on the upper end thereof, the mouth of said cup having an inturned horizontal anti-splash flange, and a stem formed integrally with and rising from the center of the bottom of the cup above the surrounding wall thereof, and terminally angular in cross section.

In testimony whereof, I affix my signature.

PATRICK JOSEPH BRENNAN.